United States Patent
Prest et al.

(10) Patent No.: US 9,447,918 B2
(45) Date of Patent: Sep. 20, 2016

(54) GREASE GUN ATTACHMENT APPARATUS

(75) Inventors: Dana Prest, Rancho Cucamonga, CA (US); Jeffery S. Mitchell, Lake Elsinore, CA (US); Bruce R. Degler, Fontana, CA (US)

(73) Assignee: Dirtraxx, Inc., Newport Beach, CA (US)

( * ) Notice: Subject to any disclaimer, the term of this patent is extended or adjusted under 35 U.S.C. 154(b) by 449 days.

(21) Appl. No.: 12/103,643

(22) Filed: Apr. 15, 2008

(65) Prior Publication Data

US 2009/0255760 A1    Oct. 15, 2009

(51) Int. Cl.
*F16N 3/12* (2006.01)
*B25H 1/00* (2006.01)

(52) U.S. Cl.
CPC .............. *F16N 3/12* (2013.01); *B25H 1/0064* (2013.01); *B25H 1/0071* (2013.01)

(58) Field of Classification Search
CPC .................................... F16N 3/10; F16N 3/12
USPC ........................................... 184/105.1, 105.2
See application file for complete search history.

(56) References Cited

U.S. PATENT DOCUMENTS

| | | | | |
|---|---|---|---|---|
| 1,276,936 A * | 8/1918 | McGee | | 248/105 |
| 1,679,855 A * | 8/1928 | Davis | | F16N 3/10 222/256 |
| 1,690,221 A * | 11/1928 | Fesler | | F16N 3/10 222/173 |
| 1,905,878 A * | 4/1933 | Albertine | | 222/256 |
| 2,463,113 A * | 3/1949 | Klein | | F16N 3/12 222/262 |
| 2,872,076 A * | 2/1959 | Bloom | | 222/651 |
| 3,193,232 A * | 7/1965 | Hatcher | | 248/231.81 |
| 3,501,063 A * | 3/1970 | Sundholm | | B05C 17/00576 222/326 |
| 4,150,806 A * | 4/1979 | Dziuk | | 248/154 |
| 4,254,926 A * | 3/1981 | Reeberg | | 248/152 |
| 5,577,697 A * | 11/1996 | Accordino | | F16M 13/02 248/206.5 |
| 5,709,321 A * | 1/1998 | Smrt | | 222/181.3 |
| 6,698,601 B1 * | 3/2004 | Nez | | 211/70.6 |
| 6,769,659 B1 * | 8/2004 | Martello | | 248/311.2 |
| 7,455,196 B2 * | 11/2008 | Montgomery | | 222/179 |
| 7,503,535 B2 * | 3/2009 | Ziaylek | | 248/313 |
| 2005/0056655 A1 * | 3/2005 | Gary | | 220/737 |
| 2005/0121580 A1 * | 6/2005 | Henry | | 248/311.2 |

FOREIGN PATENT DOCUMENTS

WO         98/91032 A    *    9/1998

* cited by examiner

*Primary Examiner* — Minh Truong
(74) *Attorney, Agent, or Firm* — Patent Venture Group; Joe A. Brock, II (57) ABSTRACT

An invention is provided for a grease gun attachment apparatus for attaching a grease gun to a metal surface. The apparatus includes a housing having a plurality of side panels, and a magnet housing that forms a portion of the housing. The magnet housing is capable of holding a magnet, which is disposed within the magnet housing. In addition, at least one fastener is connected to the housing. The fastener allows the housing to be attached to a grease gun body of a grease gun, and can be connected to the housing via the plurality of side panels.

7 Claims, 5 Drawing Sheets

GREASE GUN ATTACHMENT APPARATUS

BACKGROUND OF THE INVENTION

1. Field of the Invention

This invention relates generally to grease guns, and more particularly to a grease gun attachment apparatus for facilitating zerk fitting lubrication.

2. Description of the Related Art

To extend the life of mechanical equipment, such as automobiles, trucks, and larger construction vehicles, lubrication is used to service metal components that rotate or slide against other metal components. Such lubrication reduces friction that can occur as rotating shafts and other moving parts contact metal components during operation. Moreover, regular lubrication is necessary to replace the old lubricant that may be present. Because lubricants accumulate particles over time, new lubricant can force out older more contaminated lubricant to enhance the operation of the moving parts.

To assist in such lubrication, heavy machinery often includes grease fittings located at strategic positions on the machinery, for the injection of grease. These grease fittings are commonly termed "zerk" fittings and typically comprise a ball-shaped fitting having a spring loaded one way valve for receiving grease. When grease is provided through the zerk fitting, the grease is directed to the area of the machinery in need of lubrication. This is because zerk fittings are located in strategic positions on rotating or sliding components to enable regular lubrication of critical points.

Typically, a lubrication applicator, often termed a "grease gun," is utilized to provide grease to the zerk fittings of a particular piece of machinery. A grease gun commonly is designed to accept a tube of grease into a predefined housing. The grease gun then provides pressure to the grease tube, forcing the grease from the grease tube and out of the grease gun at a predefined outlet. The grease gun outlet generally is placed in fluid communication with a zerk fitting to provide grease to the zerk fitting.

Although zerk fittings can be located in easily accessible positions on the machinery, machinery design occasionally dictates that some zerk fittings be located in hard to reach locations. As such, grease guns include an extension, such as a flexible hose, that enables the grease gun to be utilized to lubricate hard to reach zerk fittings. The extension provides a connection between the grease gun outlet and the particular zerk fitting being lubricated.

In order to maintain an adequate connection, the grease gun operator generally is required to provide continuous positive pressure against the zerk fitting in ensure the efficient transfer of grease through the fitting. Hence, the operator is generally required to hold the extension against the zerk fitting throughout the lubrication process. Moreover, grease guns often require the operator to manually pump or crank the grease gun to force the grease from the grease tube. Specifically, the grease gun provides increased pressure on the grease tube as the operator pumps or cranks the grease gun.

Unfortunately, providing such positive pressure against the zerk fitting requires the operator to dedicate one hand to the holding the extension against the zerk fitting, leaving only one hand to both hold the grease gun and provide the pumping or cranking action required to force the grease from the grease tube. As can be appreciated, this can lead to extreme difficulties for the operator, particularly when the zerk fitting is in a hard to reach location. Often, a grease gun operator is forced to place the grease gun in their lap while the operator uses one hand to hold the extension onto the zerk fitting and the other hand to pump the grease gun to force the grease from the grease tube. Since grease guns accumulate grease residue with use, the operator is soon covered in grease and dirt as the grease and dirt is transferred from the outside of the grease gun to the operator's clothing. Moreover, when the zerk fitting is located in a hard to reach location, the task of lubricating the zerk fitting with grease gun may become too overwhelming for one operator to accomplish alone.

In view of the foregoing, there is a need for an apparatus that facilitates lubrication of zerk fittings utilizing a grease gun that can be easily operated by a single operator. The apparatus should allow a single operator to easily provide lubrication to any zerk fitting and not force the operator into awkward stances in order to accomplish lubrication tasks.

SUMMARY OF THE INVENTION

Broadly speaking, the present invention addresses these needs by providing a grease gun attachment apparatus that allows a grease gun to be firmly attached to the body of a vehicle allowing an operator to easily operate the grease gun without being required to hold the grease gun in place during operation. For example, in one embodiment an apparatus for attaching a grease gun to a surface is disclosed. The apparatus includes a housing having a plurality of side panels, and a magnet housing that forms a portion of the housing. The magnet housing is capable of holding a magnet, which is disposed within the magnet housing. In addition, at least one fastener is connected to the housing. The fastener allows the housing to be attached to a grease gun body of a grease gun, and can be connected to the housing via the plurality of side panels. In one aspect, a plurality of fasteners can be included, wherein each fastener includes a quick release clasp for quickly loosening the fastener.

A grease gun having an integrated attachment apparatus is disclosed in an additional embodiment of the present invention. The grease gun includes a grease gun body that is hollow and capable of receiving a grease tube. Attached to an open end of the grease gun body is a head cap that allows sealing of the open end of the grease gun body. In addition, an integrated attachment apparatus is included that is attached to the head cap. Similar to above, the integrated attachment apparatus includes a magnet housing attached to a magnet. In one aspect, the grease gun can include a grease pump apparatus or grease gun crank apparatus attached to the head cap, which is capable of being actuated to force grease from the grease tube. In this aspect, the integrated attachment apparatus is disposed directly opposite the grease bump apparatus or grease crank apparatus and on an opposite side of the grease gun body, thus ensuring proper alignment of the attachment apparatus when reinstalling new grease tubes into the grease gun.

A further apparatus for attaching a grease gun to a surface is disclosed in a further embodiment of the present invention. The apparatus of this embodiment includes a housing having a plurality of side panels and a bottom panel. In addition, a magnet housing is included that forms a portion of the housing. The magnet housing is formed from the plurality of side panels, the bottom panel, and a magnet housing top panel disposed lower than a top edge of each side panel. For example, the magnet housing top panel can be formed from metal folded over the bottom panel of the housing. A magnet is disposed in the magnet housing, which is capable of firmly attaching the housing to a metal surface. In addition, similar to above, a fastener is included that is connected to the housing and is capable of attaching the housing to a grease gun body. The fastener can include a quick release clasp capable of loosening the fastener. In general, the housing can be formed from a metallic material, wherein the magnet magnetically attaches to the magnet housing, thus remaining in place during operation of the apparatus. Further, a plurality of fasteners can be included, wherein each fastener has a quick release clasp capable of loosening the fastener while allowing the fastener to remain loosely attached to the grease gun body.

Because the grease gun is held firmly in place by the grease gun attachment mechanism, the operator can use both hands to operate the grease gun without requiring an additional person to hold the grease gun. As a result, the grease gun operator advantageously avoids having to place the grease gun in their lap while using one hand to hold the flexible extension hose onto a zerk fitting and the other hand to pump the grease gun to force the grease from the grease tube. Moreover, when the zerk fitting is located in a hard to reach location, the task of lubricating the zerk fitting with grease gun can be easily accomplished by one operator. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a grease gun attachment apparatus that allows a grease gun to be firmly attached to the body of a vehicle allowing an operator to easily provide positive pressure against a zerk fitting while providing the pumping or cranking action required to force grease from the grease gun. Broadly speaking, embodiments of the present invention provide a magnetic housing that attaches to a grease gun. The magnetic housing includes a magnet that provides enough magnetic force to firmly attach the magnetic housing, and thereby the grease gun, to a metal surface, such as the surface of a vehicle. Once attached, the operator can easily perform the actions necessary to operate the grease gun, for example, to provide grease to the various zerk fittings on heavy machinery.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1A:
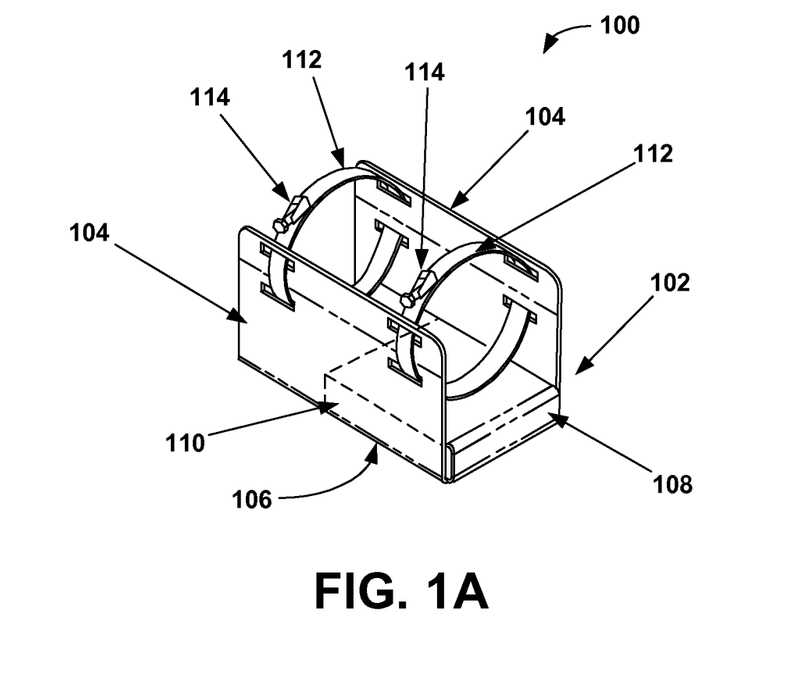
FIG. 1A is a diagram showing a front view of an exemplary grease gun attachment apparatus, in accordance with an embodiment of the present invention.
Figure 1B:
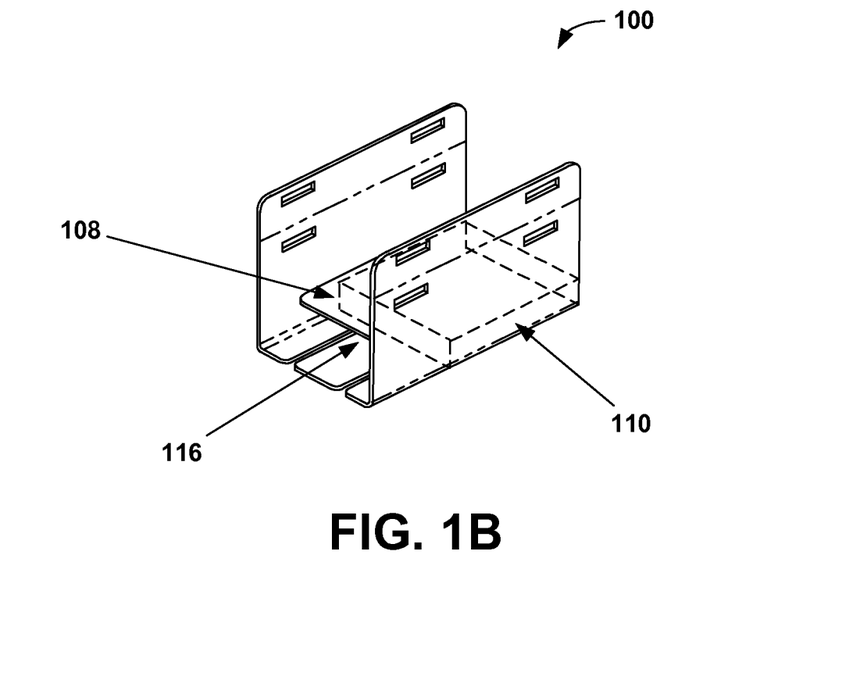
FIG. 1B is a diagram showing a rear view of the exemplary grease gun attachment apparatus, in accordance with an embodiment of the present invention.

FIG. 1A is a diagram showing a front view of an exemplary grease gun attachment apparatus 100, in accordance with an embodiment of the present invention. FIG. 1B is a diagram showing a rear view of the exemplary grease gun attachment apparatus 100, in accordance with an embodiment of the present invention. As illustrated in FIG. 1A and FIG. 1B, the exemplary grease gun attachment apparatus 100 includes a housing, shown generally at 102, having a plurality of side panels 104, a bottom panel 106, and a magnet housing 108. In one embodiment, the magnet housing 108 forms a portion of the housing 102, and is formed from the plurality of side panels, the bottom panel, and a magnet housing top panel disposed lower than a top edge of each side panel.

The magnet housing 108 houses a magnet 110, which generally is selected to have a gauss rating such that the magnet 110 can hold several pounds of weight to a metal object in order to firmly magnetically affix the grease gun attachment apparatus 100, and by extension an attached grease gun to the metal object. The exemplary grease gun attachment apparatus 100 illustrated in FIG. 1A also includes one or more mechanical fasteners 112 to hold the grease gun attachment apparatus 100 onto a grease gun. In one embodiment, the mechanical fasters 112 include quick release clasps 114 that allow the mechanical fasters 112 to be quickly detached or loosened to release an attached grease gun, as will be described in greater detail subsequently.

As illustrated in FIG. 1B, one embodiment of the present invention includes a magnet housing 108 having an open end 116. It should be noted that the mechanical fasteners 112 have been removed from FIG. 1B to more easily illustrate the magnetic housing 108. The open end 116 of the magnet housing 108 allows the magnet 110 to be easily inserted into the magnet housing 108. In one embodiment, the grease gun attachment apparatus 100 is constructed of a metallic material capable of adhering to a magnet. In this embodiment, the magnet 110 attaches to the metallic sides of the magnet housing 108, preventing the magnet 110 from inadvertently slipping out of the open end 116 of the magnet housing 108. In this manner, the magnet 110 can be easily inserted and removed by the operator yet will stay in place during normal operation because of the magnetic attachment between the magnet 110 and the metal sides of the magnet housing 108. In operation, the grease gun attachment apparatus 100 is attached to a grease gun, as illustrated next with reference to FIG. 2.

Figure 2:
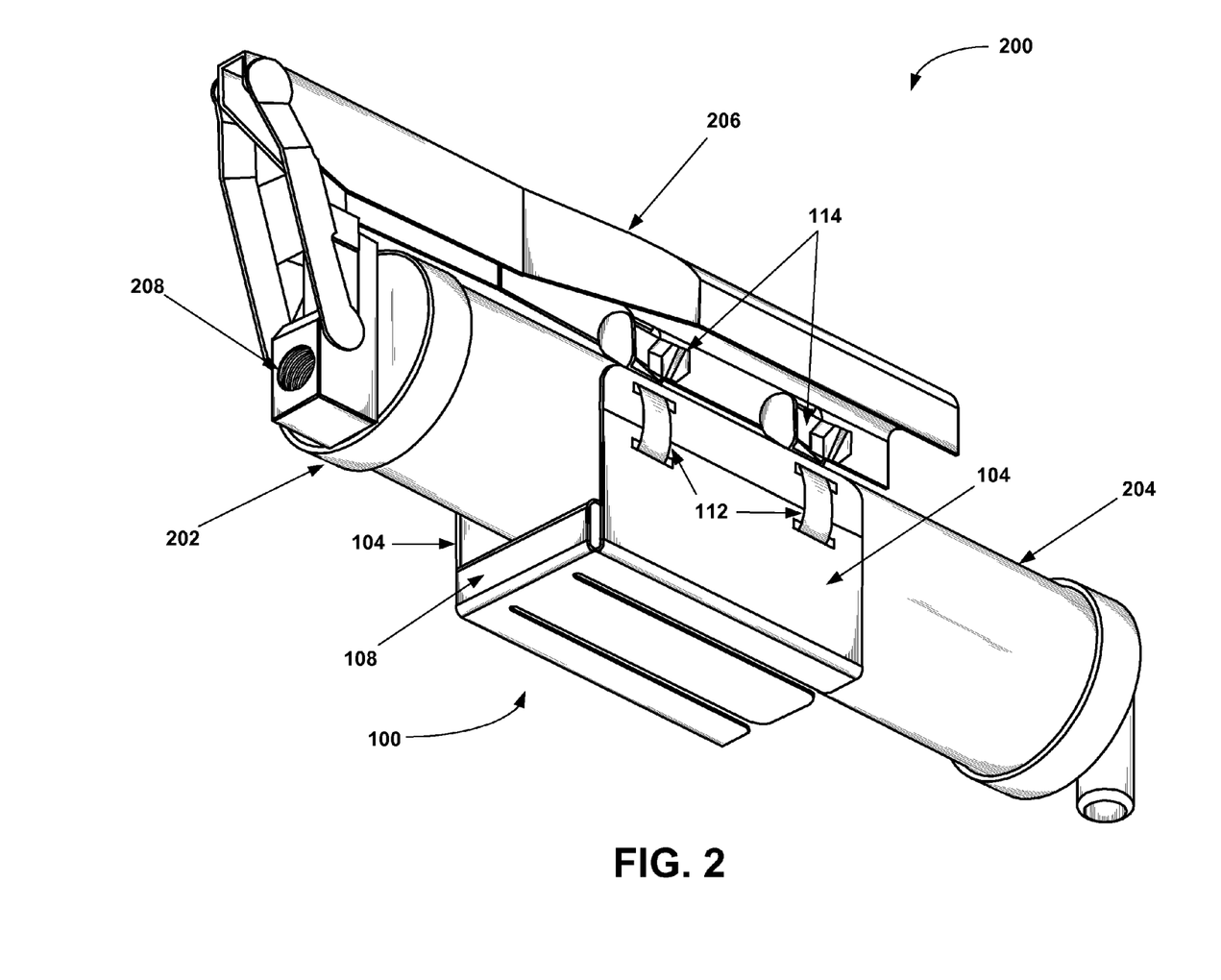
FIG. 2 is an illustration showing a typical grease gun attached to a grease gun attachment apparatus, in accordance with an embodiment of the present invention.

FIG. 2 is an illustration showing a typical grease gun, shown generally at 200, attached to a grease gun attachment apparatus 100, in accordance with an embodiment of the present invention. As illustrated in FIG. 2, a typical grease gun 200 includes a grease gun body 204 attached to a head cap 202, which itself is attached to a grease pump mechanism 206. As is well known in the art, a grease gun is utilized to dispense grease from a grease tube (not illustrated). To this end, an operator can insert a grease tube into the grease gun 200 by unscrewing the head cap 202 and inserting the grease tube into the grease gun body 204, which hollowed to accept the grease tube.

Once the grease tube is inserted into the grease gun body 204, the head cap 202 is screwed back onto the grease gun body 204, sealing the grease tube into the grease gun. Next, the operator uses the grease pump mechanism 206 to pump the grease from the grease tube. The grease exits the grease gun 200 via a head cap opening 208 disposed in the head cap 202. Although not illustrated in FIG. 2, a flexible extension hose generally is attached to the head cap opening 208 to transfer grease escaping from the head cap opening 208 to locations at which the free end of the flexible extension hose is placed. For example, when lubricating heavy machinery, the free end of the flexible extension hose can be placed on a zerk fitting.

However, as discussed above, in order to maintain an adequate connection, the grease gun operator generally is required to provide continuous positive pressure against the zerk fitting in ensure the efficient transfer of grease through the fitting. Hence, the operator is generally required to hold the flexible extension hose against the zerk fitting throughout the lubrication process. The operator then manually pumps the grease pump mechanism 206 to force the grease from the grease tube.

Unfortunately, providing such positive pressure against the zerk fitting requires the operator to dedicate one hand to the holding the flexible extension against the zerk fitting, leaving only one hand to both hold the grease gun 200 and provide the pumping action required to force the grease from the grease tube. As can be appreciated, this can lead to extreme difficulties for the operator, particularly when the zerk fitting is in a hard to reach location. Often, a grease gun operator is forced to place the grease gun in their lap while the operator uses one hand to hold the extension onto the zerk fitting and the other hand to pump the grease gun to force the grease from the grease tube. Since grease guns accumulate grease residue with use, the operator is soon covered in grease and dirt as the grease and dirt is transferred from the outside of the grease gun to the operator's clothing. Moreover, when the zerk fitting is located in a hard to reach location, the task of lubricating the zerk fitting with grease gun may become too overwhelming for one operator to accomplish alone.

To address this issue, embodiments of the present invention allow the grease gun 200 to attached to a metal object using the grease gun attachment apparatus 100. As shown in FIG. 2, the grease gun attachment apparatus 100 attaches to the grease gun body 204 using the fasters 112. Specifically, the grease gun body 204 is partially placed between the side panels 104 and a magnet housing 108 of the grease gun attachment mechanism 100. The fasteners 112 are then utilized to fasten the grease gun attachment mechanism 100 to the grease gun body 204. In one embodiment, the fasteners 112 are adjustable, allowing the grease gun attachment apparatus 100 to be attached to a variety of grease guns of varying sizes. Once adjusted to fit the particular grease gun 200 being utilized, the quick release clasps 114 are tightened, hence securing the grease gun attachment apparatus 100 to the grease gun body 204. As will be described in greater detail subsequently, the quick release clasps 114 allow the grease gun attachment apparatus 100 to be quickly repositioned during grease tube replacement. Although, FIG. 2 illustrates a grease gun attachment apparatus 100 having square side panels 104 and two fasteners 112, it should be noted that a grease gun attachment apparatus 100 can be manufactured in any configuration that allows the grease gun to be magnetically attached to a metal surface, as illustrated next with reference to FIG. 3.

Figure 3:
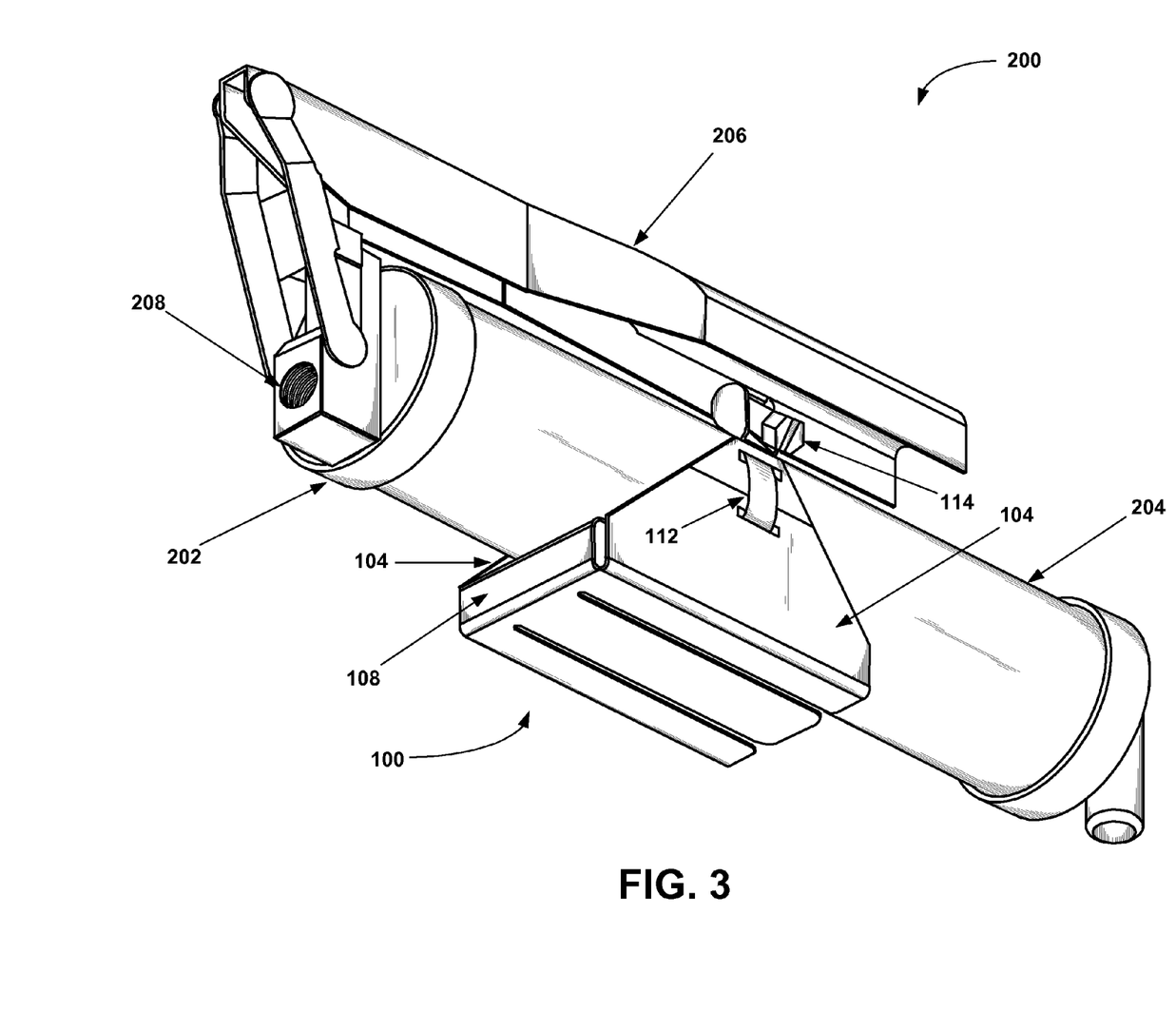
FIG. 3 is an illustration showing a typical grease gun attached to a grease gun attachment apparatus having a single fastener, in accordance with an embodiment of the present invention.

FIG. 3 is an illustration showing a typical grease gun 200 attached to a grease gun attachment apparatus 100 having a single fastener 112, in accordance with an embodiment of the present invention. Similar to FIG. 2, the grease gun 200 of FIG. 3 includes a grease gun body 204 attached to a head cap 202, which itself is attached to a grease pump mechanism 206. Although not illustrated in FIG. 3, a flexible extension hose generally is attached to the head cap opening 208 to transfer grease escaping from the head cap opening 208 to locations at which the free end of the flexible extension hose is placed, such as on a zerk fitting.

As shown in FIG. 3, the grease gun attachment apparatus 100 attaches to the grease gun body 204 using the faster 112. Specifically, the grease gun body 204 is partially placed between the side panels 104 and a magnet housing 108 of the grease gun attachment mechanism 100. The fastener 112 is then utilized to fasten the grease gun attachment mechanism 100 to the grease gun body 204.

In the embodiment of FIG. 3, the side panels 104 are tapered to fit a single fastener 112, which also includes a quick release clasp 114. Similar to the embodiment of FIG. 2, the fastener 112 of the embodiment of FIG. 3 is adjustable, allowing the grease gun attachment apparatus 100 to be attached to a variety of grease guns of varying sizes. Once adjusted to fit the particular grease gun 200 being utilized, the quick release clasp 114 is tightened, hence securing the grease gun attachment apparatus 100 to the grease gun body 204. Although the embodiments of the present invention have thus far been described in terms of separate units capable of being attached to a grease gun, embodiments of the present invention can also be integrated into the structure of a grease gun, as illustrated next with reference to FIG. 4.

Figure 4:
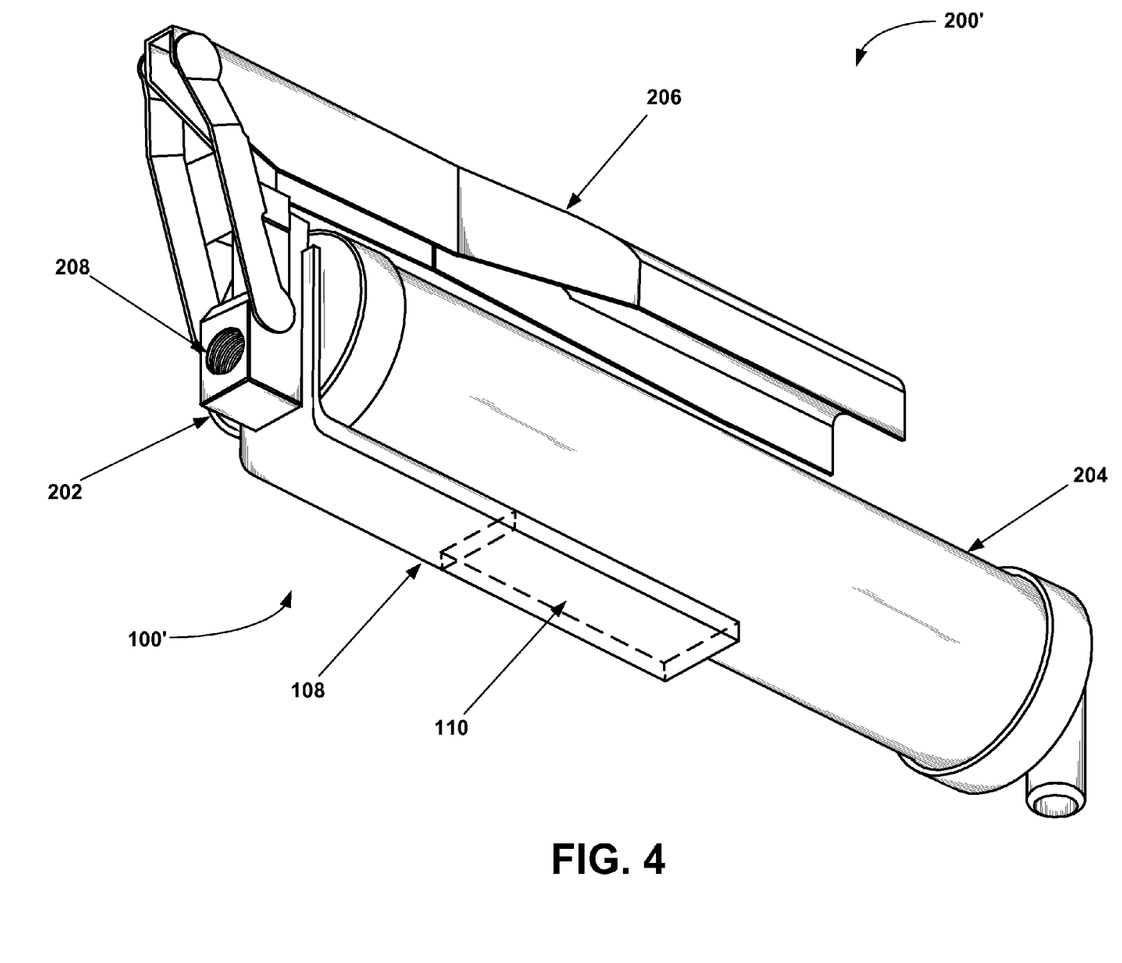
FIG. 4 is an illustration showing a grease gun having an integrated grease gun attachment apparatus, in accordance with an embodiment of the present invention.

FIG. 4 is an illustration showing a grease gun 200' having an integrated grease gun attachment apparatus 100', in accordance with an embodiment of the present invention. The grease gun 200' includes a grease gun body 204 attached to a head cap 202, which itself is attached to a grease pump mechanism 206. In addition, the grease gun 200' includes an integrated grease gun attachment apparatus 100' attached to the head cap 202 of the grease gun 200'. The integrated grease gun attachment apparatus 100' includes a magnet housing 108 configured to hold the magnet 110 in place on the integrated grease gun attachment apparatus 100'. As illustrated in FIG. 4, in one embodiment, the magnet housing 108 may connect to an end of the magnet 110, thus providing a means to attach the magnet 110 to the magnet housing 108.

In the embodiment of FIG. 4, the integrated grease gun attachment apparatus 100' is attached to the head cap 202 of the grease gun 200'. For example, in one embodiment, the integrated grease gun attachment apparatus 100' and the head cap 202 can be manufactured by casting the integrated grease gun attachment apparatus 100' and the head cap 202 as one integrated piece using any appropriate casting processes. In order to ensure proper alignment, the integrated grease gun attachment apparatus 100' is positioned opposite the grease gun pump 206, which is also attached to the head cap 202. In this manner, the integrated grease gun attachment apparatus 100' remains in proper position regardless of the actual position of the grease gun body 204. As a result, when the head cap 202 is removed from the grease gun body 204 and the grease tube is changed, the integrated grease gun attachment apparatus 100' will remain properly positioned when the head cap 202 is reattached to the grease gum body 204.

Figure 5:
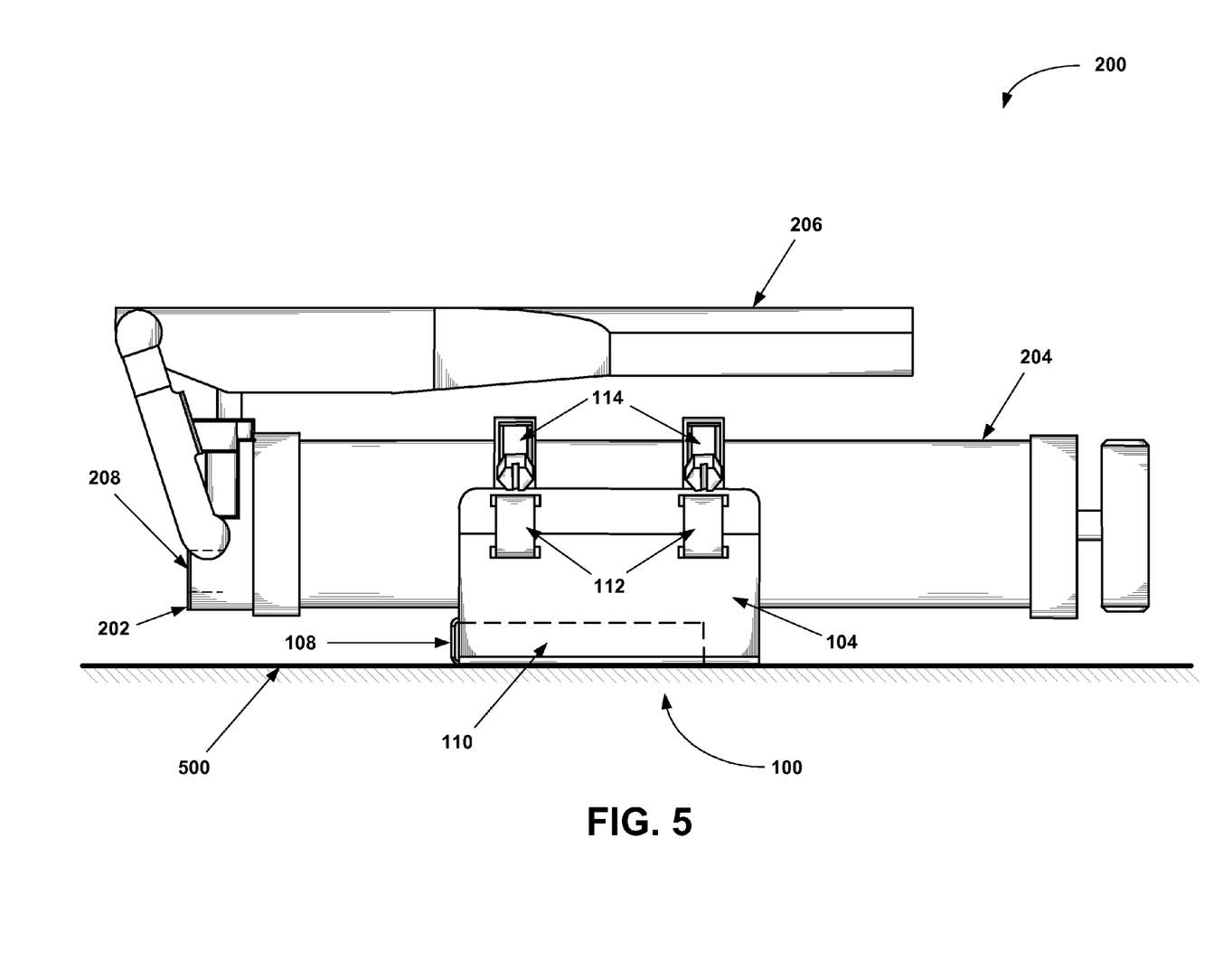
FIG. 5 is an illustration showing a grease gun attached to a metal surface using a grease gun attachment apparatus, in accordance with an embodiment of the present invention.

FIG. 5 is an illustration showing a grease gun 200 attached to a metal surface 500 using a grease gun attachment apparatus 100, in accordance with an embodiment of the present invention. As described above, the grease gun 200 includes a grease gun body 204 attached to a head cap 202, which itself is attached to a grease pump mechanism 206. Attached to the grease gun body 204 is a grease gun attachment apparatus 100. As mentioned previously, the grease gun body 204 is partially placed between the side panels 104 and the magnet housing 108 of the grease gun attachment mechanism 100. Fasteners 112 are then utilized to fasten the grease gun attachment mechanism 100 to the grease gun body 204. The fasteners 112 can be adjustable to allow the grease gun attachment apparatus 100 to be attached to a variety of grease guns of varying sizes. Once adjusted to fit the particular grease gun 200 being utilized, the quick release clasps 114 are tightened, securing the grease gun attachment apparatus 100 to the grease gun body 204.

FIG. 5 illustrates the grease gun 200 magnetically attached to a metal surface 500 using the grease gun attachment apparatus 100. The grease gun attachment apparatus 100 allows the grease gun 200 to be firmly attached to the metal surface 500, such as the body of a vehicle, allowing an operator to easily provide positive pressure against a zerk fitting while providing the pumping or cranking action using the grease gun pump 206 to force grease from the grease gun 200. The magnet 110 housed in the magnetic housing 108 provides enough magnetic force to firmly attach the magnetic housing 108, and thereby the grease gun 200, to a metal surface 500, such as the surface of a vehicle. Once attached, the operator can easily perform the actions necessary to operate the grease gun, for example, to provide grease to the various zerk fittings on heavy machinery.

During use, eventually the grease tube stored in the grease gun 200 will require replacement. When this occurs, the head cap 202 is removed from the grease gun body 204 and a new grease tube is inserted into the grease gun body 204. Once the grease tube is inserted into the grease gun body 204, the head cap 202 is screwed back onto the grease gun body 204, sealing the grease tube into the grease gun. Often, when installing a new grease tube into the grease gun 200 and reattaching the head cap 202 on the grease gun 204 body, the grease gun pump 206 and the grease gun attachment apparatus 100 may no longer line up correctly (i.e., with the grease pump mechanism 206 directly opposite the grease gun attachment apparatus 100). Fortunately, the quick release clasps 114 allow the grease gun attachment apparatus 100 to be quickly repositioned during grease tube replacement. Specifically, the quick release clasps 114 allow the fasteners 112 to be loosened enough to allow the grease gun body 204 to be twisted to allow the grease pump mechanism 106 to line up directly opposite magnet housing 108 of the grease gun attachment mechanism 100. The quick release clasps 114 can then be quickly retightened to fix the grease gun 200 in place.

Once the grease gun 200 is attached to the metal surface 500 via the grease gun attachment mechanism 100, the operator can use the grease pump mechanism 206 to pump the grease from the grease tube. The grease exits the grease gun 200 via a head cap opening 208 disposed in the head cap 202. As discussed above, a flexible extension hose generally is attached to the head cap opening 208 to transfer grease escaping from the head cap opening 208 to locations at which the free end of the flexible extension hose is placed. For example, when lubricating heavy machinery, the free end of the flexible extension hose can be placed on a zerk fitting.

Because the grease gun 200 is held firmly in place by the grease gun attachment mechanism, the operator can use both hands to operate the grease gun 200 without requiring an additional person to hold the grease gun 200. As a result, the grease gun operator advantageously avoids having to place the grease gun 200 in their lap while using one hand to hold the flexible extension hose onto a zerk fitting and the other hand to pump the grease gun to force the grease from the grease tube. Moreover, when the zerk fitting is located in a hard to reach location, the task of lubricating the zerk fitting with grease gun can be easily accomplished by one operator.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A grease gun having an integrated attachment apparatus for assisting in lubricating machinery, comprising:
   a grease gun body, wherein the grease gun body is hollow and capable of receiving a grease tube;
   a head cap and the integrated attachment apparatus cast together as one piece, the head cap being attached to an open end of the grease gun body, the integrated attachment apparatus having a magnet housing attached with a magnet, wherein the magnet is positioned within the magnet housing at a longitudinal end of the magnet housing that is opposite the head cap, wherein the magnet is disposed at a longitudinal center of the grease gun body; and
   a grease pump apparatus attached to the head cap, the grease pump apparatus capable of being actuated to force grease from the grease tube, wherein the integrated attachment apparatus is disposed opposite the grease pump apparatus on an opposite side of the grease gun body.

2. An integrated grease gun attachment apparatus for assisting in lubricating machinery utilizing a grease gun body, comprising:
   a head cap for receiving the grease gun body, a magnet housing capable of holding a magnet, both the head cap and the magnet housing being cast together as one piece; and
   a magnet disposed in the magnet housing,
   a grease gun pump apparatus attached to the head cap;
   wherein the magnet housing is positioned opposite the grease gun pump apparatus with respect to the head cap, and wherein the magnet is positioned within the magnet housing at a longitudinal end of the magnet housing that is opposite the head cap, wherein the magnet is disposed at a longitudinal center of the grease gun body when the grease gun body is attached to the integrated grease gun attachment apparatus.

3. An apparatus as recited in claim 2, wherein the magnet housing includes an open end capable of receiving the magnet.

4. An apparatus as recited in claim 3, wherein the magnet housing encloses the magnet except for the open end.

5. A grease gun head cap having an integrated attachment apparatus for assisting in lubricating machinery using a grease gun body, comprising:

the grease gun head cap and the integrated attachment apparatus cast together as one piece, the integrated attachment apparatus having a magnet housing attached with a magnet, wherein the magnet is positioned within the magnet housing at a longitudinal end of the magnet housing that is opposite the head cap, wherein the magnet is disposed at a longitudinal center of the grease gun body when the grease gun body is attached to the integrated grease gun attachment apparatus; and a grease pump apparatus attached to the head cap, the grease pump apparatus capable of being actuated to force grease from a grease tube, wherein the integrated attachment apparatus is disposed opposite the grease pump apparatus on an opposite side of the grease gun body.

6. An apparatus as recited in claim 5, wherein the housing is formed from a metallic material.

7. An apparatus as recited in claim 6, wherein the magnet magnetically attaches to the magnet housing, whereby the magnet remains in place during operation of the apparatus.

* * * * *